3,773,852
PROCESS FOR INCREASING THE REACTIVITY AT SOLID SURFACES

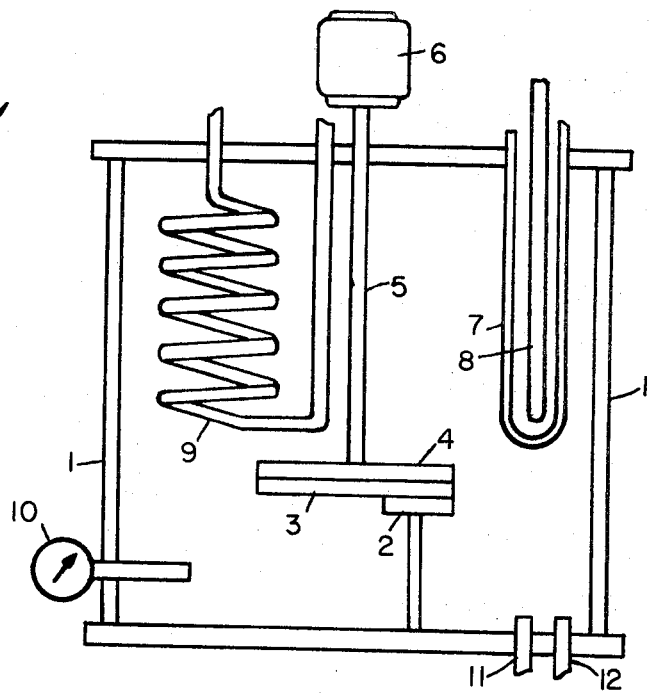
*Fig. 1*
*Fig. 3*
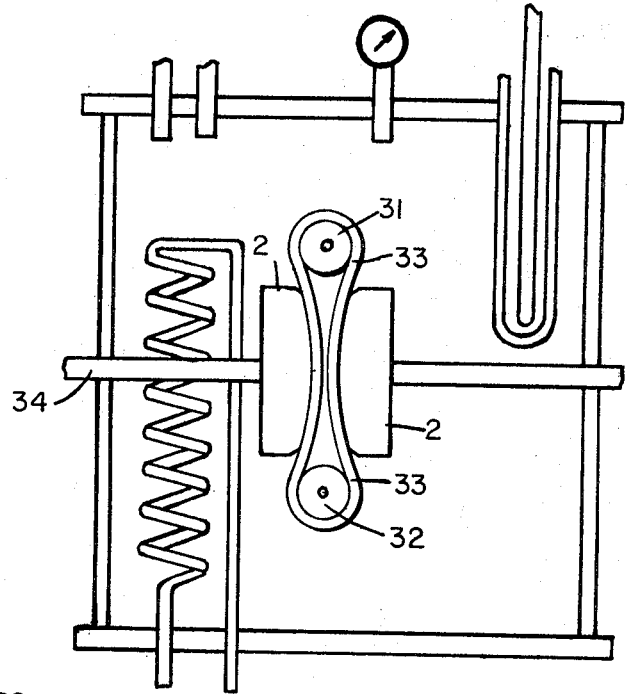
*Fig. 2*
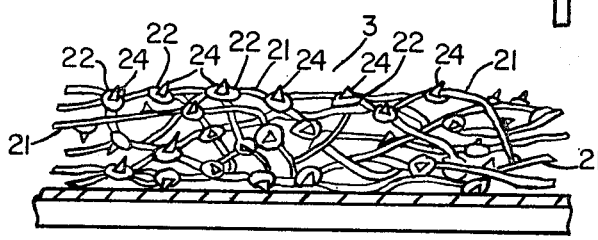
INVENTORS
WILLIAM J. GOYETTE AND
STANLEY J. SUPKIS
BY Cushman, Darby & Cushman
ATTORNEYS INVENTORS
WILLIAM J. GOYETTE AND
STANLEY J. SUPKIS
BY Cushman, Darby & Cushman
ATTORNEYS

William J. Goyette, Brimfield, Ohio, and Stanley J. Supkis, Averill Park, N.Y., assignors to Norton Company, Worcester, Mass.
Filed Apr. 21, 1971, Ser. No. 136,146
Int. Cl. C01b 31/20; C07c 5/02, 5/10
U.S. Cl. 260—683.9                                     11 Claims

ABSTRACT OF THE DISCLOSURE

A process for attaining and maintaining a multi-fold increase in the normal catalytic activity of a massive solid type catalyst body. This is accomplished by subjecting the surface of the catalyst body to an essentially continuous, mild abrasive action imparted by pressing a moving coated or bonded abrasive tool against the catalyst surface while exposing the catalyst to the reactants and appropriate reaction conditions. The continuous abrasion prevents the deleterious formation of poison on the catalyst surface, increases the surface energy of the catalyst per se, and, it is believed, sweeps reactants onto and product off of the catalyst.

FIELD OF THE INVENTION

Reaction rates of many chemical reactions are known to be increased by certain solid materials known as catalysts. Generally, the catalyst materials have been produced as small particles or porous particulate material which have the advantage of maximizing the surface area per mass of catalyst used. The reactivity, and more particularly, the reaction rate per unit surface area of a solid catalyst participating in a reaction (activity) is often undesirably small at a temperature to be empolyed, thus requiring the use of small or porous catalyst particles which maximize the surface area per unit mass of catalyst. This situation reflects a combination of the following factors:

(1) Passivation of the solid surface through the formation of a stable, unwanted compound (poison) on the surface of the catalyst. For example, the formation of oxide or halide layers on the surface of a Ni hydrogenation catalyst.

(2) Relatively low mean surface energy of the solid.

(3) Bulk mass transfer limitations. Here bulk mass transfer refers to the movement of reactants toward and products away from the solid surface.

The present invention is directed to increasing the reactivity on the surface (activity) of a large solid mass thereby obtaining an effective catalyst from large solid masses as contrasted to the porous and particulate catalyst of the prior art.

DESCRIPTION OF PRIOR ART

Much effort has been expended in the past to find methods and materials which will speed up the rate of heterogenous chemical reactions. This effort has not been in vain, as catalysts have been found which increase the rate of many chemical reactions sufficiently such that such reactions can be carried out economically and commercially whereas without these catalysts, the processes would simply be interesting laboratory phenomena.

The reactivity and catalytic effectiveness of a given mass of solid material is known to be related to its surface area and to the surface free energy. The early attempts to increase reaction rates involving solid catalyst surfaces focused on maximizing the surface area of the catalyst. Methods of accomplishing this involved creating small or porous particles of catalyst or dispersing thin films of catalytic material on a support material. However, even large surface areas of catalyst may not provide the desired reaction rates, especially in the event of cumulative poisoning from impure feedstocks.

To rejuvenate poisoned catalyst (catalyst particles whose reactivity has decreased due to fouling of the surface) several methods, both chemical and mechanical, have been suggested. Those methods utilizing mechanical rejuvenation have been based on free abrasion methods. In West German Pat. No. 1,097,417, the poisoned catalyst surface is restored by treating the catalyst with finely divided abrasives such as corundum and Carborundum in the form of aerosols or suspensions. These references also teach that such treatment will increase the effectiveness of the treated catalyst surface above that of the original state when the treatment is carried out during the catalytic process either continuously or intermittently as an impact treatment at short intervals.

In U.S. Pat. No. 1,412,219, a process for regenerating or reactivating spent catalyst particles in disclosed wherein the finely divided catalyst particles are subjected to a mechanical resurfacing operation. The surface film or coating of the spent catalyst particles is removed by the action of finely divided abrasives in a ball mill, resulting in the restoration of catalytic activity. In U.S. Pat. No. 2,605,234, a fluidized mass of catalyst particles are abraded by each other and in U.S. Pat. No. 2,892,771 abrasive particles are incorporated with the catalyst particles in the fluidized bed.

In each of the above methods, free abrasion is the sole abrasive action on the solid surfaces and the solid surfaces are all in the form of small, finely divided particles. Because one can exert little control over the free abrasion process, it is inherently inefficient and thus relatively long abrasion times are required to effectively restore a catalytically active surface to the material being processed.

Each of the above-mentioned processes is concerned with rejuvenation of finely divided particle forms of catalyst and not with the activation of larger forms herein referred to as "massive" forms of catalyst. By "massive" forms of catalyst is meant forms wherein the entire mass of the solid catalyst material is bounded primarily by continuous outer extremities, i.e., such shapes as rings, discs, wires and plates as contrasted to small finely divided particles. U.S. Pats. Nos. 1,331,903 and 1,331,904 relate to methods of producing nickel catalyst particles in a finely pulverulent state by subjecting bulk "massive" forms of nickel to mechanical attrition, abrasion or comminution. These patents teach an abrasive action to produce highly active nickel particles, however, they do not suggest the formation of any catalytic surface on the massive nickel article itself.

In West German Pat. No. 1,087,117, there is disclosed a process for increasing the reactivity and catalytic effect of solid materials by treating the surface of the solid material with finely divided abrasives in the form of aerosols or suspensions. This process is similar to those mentioned above where free abrasive methods were used to rejuvenate the catalyst particles.

There are several disadvantages characteristic of all free abrasive methods including:

(1) Energy is inefficiently transmitted to the surface of the solid. A large portion of the kinetic energy of the abrasive particle is carried away by the particle after colliding with and elastically rebounding from the solid surface.

(2) A large proportion of the kinetic energy of the abrasive particle is absorbed by the fluid medium surrounding the surface of the solid. Also, collision between abrasive particles approaching the surface and those rebounding reduces the magnitude of power transferred to the solid surface.

(3) Because one exerts relatively little control over motion of the abrasive grain at impact and also because the point of impact is relatively small, the area on the surface affected by a single grain is relatively small.

The prior art has relied upon simple solution agitation for bulk mass transfer of reactants and products by stirring or other methods of agitation imposed upon the system. There is no suggestion that bulk mass transfer of reactants to the catalyst and products from the catalyst can be improved by the same apparatus which simultaneously prevents passivation of the catalyst and increases the surface activity of the catalyst.

SUMMARY

The present invention is directed toward a catalytic process and apparatus utilizing a solid massive catalyst surface wherein the surface of the catalyst is simultaneously treated to (1) increase the effective catalytic activity above the catalytic activity of the original surface, (2) prevent passivation or deactivation of the catalyst surface and (3) improve bulk mass transfer of reactants towards and products away from the catalytic surface. The surface of the catalyst may be treated continuously or intermittently during the reaction period thereby producing a system containing an active catalyst surface which does not degenerate in its catalytic activity as the process proceeds.

The above-mentioned treatment is effected by repetitively contacting the surface of the massive catalyst article in a continuous or periodic manner under controlled contact pressures with a porous matrix material containing abrasive-like particles. The controlled abrasive-like treatment of the catalyst surface induces lattice distortion and imperfections in the surface of the catalyst material thereby markedly increasing the catalytic activity of the treated surface. The porous matrix material which serves as the support for the abrasive-like particles also provides an excellent degree of bulk mass transfer and distribution of reactants and products at the solid catalyst surface as it continuously travels through the bulk reactants and into contact with the catalyst surface. The abrasive-like treatment of the catalyst surface prevents the passivation or deactivation of the catalyst surface by removing film-forming impurities and poisons from the surface of the catalyst. The increase in catalyst effectiveness, improvement in bulk mass transfer and prevention of catalyst passivation or deactivation are obtained simultaneously and continuously throughout the reaction period.

The increased catalystic effectiveness of the treated catalyst surface was found to be dependent on the power transferred by the abrasive-like action to the catalyst surface (reflecting the creation of lattice distortions and surface imperfections mentioned above) and was also found to be strongly dependent on the speed of the abrasive-like material upon the surface of the catalyst (reflecting the effect of bulk mass transfer mentioned above, as well as the rate of generation of new active sites on the catalyst surface).

The increased catalytic effectiveness of treated massive nickel catalysts in the hydrogenation of styrene and ethylene was found to be in the order of up to 1,000 times that of the untreated nickel whose activity was assumed equal to that of commercial Raney nickel in terms of equivalent surface areas.

The rate of reactions occurring in the presence of a massive catalyst surface for certain reactions was found to be directly related to bulk mass transfer. The apparatus of the present invention, as mentioned above, effectively accomplishes bulk mass transfer simultaneously with the surface activation of the catalyst surface,

DRAWINGS

The present invention is explained hereinafter in greater detail by reference to the accompanying drawings which show one preferred embodiment of this invention. It should be understood, however, that the drawings and examples are given for purposes of illustration and that the invention in its broader aspects is not limited thereto.

In the drawings:

FIG. 1 is a side view of one preferred embodiment of apparatus employing this invention.

FIG. 2 illustrates diagrammatically a portion of a cross section of one type of porous activating medium useful in the present invention.

FIG. 3 is a side view of a second preferred embodiment of apparatus employing this invention.

DESCRIPTION OF PREFERRED EMBODIMENTS

Figure 4:
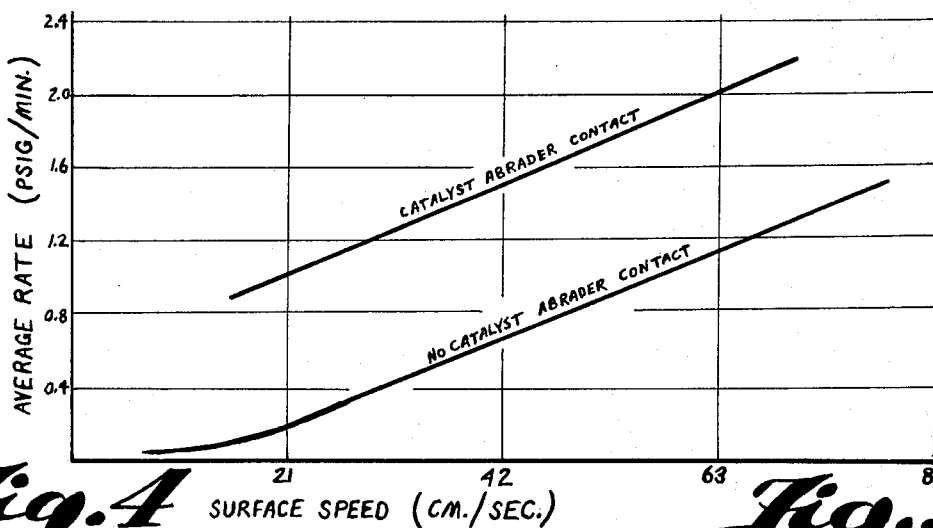
FIG. 4 is a graph showing the activity of a nickel disc catalyst as a function of abrader speed relative to the nickel disc.

Referring now to FIG. 1, the apparatus of a preferred embodiment of the present invention comprises a reactor vessel 1 containing a thermowell 7, thermometer 8, pressure gauge 10, temperature control coil 9 and openings 11 and 12 for admitting reactants into the reactor 1. The reactor 1 is also equipped with a central shaft 5 which extends through the reactor wall and is connected to a motor 6 on the outside of reactor 1 and to a metal disc 4 on the inside of the reactor 1. A porous pad 3 containing abrasive-like particles is bonded to metal disc 4. A catalytic disc 2 is mounted to reactor 1 so as to contact the surface of porous pad 3. The motor 6, shaft 5, metal disc 4 and porous pad 3 were mounted so that the shaft 5 could be advanced and withdrawn from the reactor in such a manner that the contact pressure between porous pad 3 and catalyst disc 2 could be varied from approximately 1000 grams/cm.$^2$ to zero. The porous pad 3 could be withdrawn from the surface of catalyst disc 2 so as to make no contact with catalyst disc 2.

FIG. 2 shows a highly enlarged and idealized portion of one type of abrasive-like media suitable for use as the porous pad 3. FIG. 2 particularly illustrates the porous matrix-hard abrasive-like particle relationship which is desirable. Reference numeral 21 represents fibers of a non-woven web (fibers such as poly[ethylene terephalate], nylon, metal or the like) which are anchored one to the other at their points of intersection by an adhesive binder 22. A plurality of small, hard, discrete particles 24 are positioned on the fibers 21 and in the present illustration are held to such fibers by adhesive 22. For purposes of illustration, the hard particles 24 are here shown dispersed throughout the porous matrix structure, however, all that is essential is that the surface of the porous matrix contains the hard particles and that the hard particles come into contact with the catalyst surface during the reaction period. It is thus evident that other porous materials can be used in place of the non-woven fiber material shown in FIG. 2. Such materials as open weave-woven fabrics, foamed organic and inorganic materials, wire screen and wire mesh materials can be used. The hard particles can be made of any material which acts as an abrasive at the speed and pressure used in contacting the catalyst surface. Such material includes well-known abrasive particles as well as organic and inorganic particles which have a dynamic hardness greater than the hardness of the catalyst mass being contacted. The abrading medium is fully described in copending application of William J. Goyette, Ser. No. 136,145, filed Apr. 1, 1971, and the entire disclosure of this copending application is incorporated herein by reference.

A variation of the apparatus of FIG. 1 is shown in FIG. 3 wherein the porous, abrasive-like particle containing material is formed into a belt 33 which extends over rollers 31 and 32. One or both rollers 31 and 32 are driven by a motor (not shown) so as to set the belt 33 in motion around the rollers. The catalyst masses 2 are attached to rods 34 which extend through the reactor 1 and are so mounted that they can be advanced or withdrawn from the reactor. The catalyst masses 2 can thus be advanced towards belt 33 to contact the belt 33 so as to develop the desired contact pressure.

EXAMPLE 1

Using apparatus similar to that shown in FIG. 1, ethylene was catalytically hydrogenated using a massive nickel catalyst. The reactions were carride out in a reactor having a 1,000 ml. capacity and constructed of stainless steel. The reactants (ethylene and hydrogen) were charged to the reactor to a predetermined pressure and the reaction rates were determined by the change in pressure monitored on the pressure gauge. A liquid heat transfer medium was circulated through coils extending within the reactor to maintain a constant reactor temperature.

The porous abrasive-like material used was a non-woven web of polyester fibers bonded with an acrylonitrile-melamine resin adhesive and roll coated with a phenolic adhesive and abrasive grain, in this case 180 mesh $Al_2O_3$ grain. An equally effective abrader was made from needle-punched stainless steel wool bonded with a phenol-formaldehyde resin containing $Al_2O_3$ abrasive grain. The essential features in either of these abrasive materials was a high concentration of abrasive grain at the surface of the porous matrix backing which comes into contact with the catalyst surface and a porous resilient backing matrix.

A variable speed drive was used in rotating the abrasive pad which allowed selection of the catalyst-abrader surface speed. The horizontal sliding force between the catalyst and abrader surface was monitored using a dead weight countertorque technique with the reactor mounted on a torque table.

The abraded portion of the surface of the nickel catalyst disc was 10 cm.$^2$. The backside of this disc was in contact with the reactor and was therefore occluded and effectively removed from the catalytic reaction.

The reaction vessel was then purged with hydrogen. When the reactor was satisfactorily purged of air and contained essentially hydrogen, the purge was discontinued and a specified pressure of hydrogen (200 p.s.i.g.) was built up in the reactor. After the set hydrogen pressure was obtained, ethylene was charged to the reactor to a total specified pressure (350 p.s.i.g.). The abrader disc was put in motion and the abrader then lowered until contact with the catalyst surface at a specified horizontal sliding force was obtained. The reaction between the ethylene and hydrogen was then monitored by the pressure variation in the reactor. The temperature of the reactor was kept constant at approximately 21° C.

Table 1 shows the activity (defined as moles of reactants converted per square centimeter per minute) for various abrader-catalyst surface speeds.

TABLE 1

| Activity (moles/ cm.$^2$ min.) | Abrader-catalyst horizontal sliding force per contact area (grams/ cm.$^2$) | Abrader speed relative to catalyst surface (cm./sec.) |
|---|---|---|
| (5.1±1.5)×10$^{-4}$ | 90 | 47 |
| (1.6±1.5)×10$^{-4}$ | 90 | 32 |

EXAMPLE 2

The procedure described in Example 1 was repeated with the following modification. The abrasive pad was rotated but the massive nickel catalyst was not present. In its place, a commercial Raney nickel catalyst in particulate form was introduced. The activity of the particulate Raney nickel catalyst was found to be (3.8±0.3)×10$^{-7}$ based on the Raney nickel having a surface area of 50 m.$^2$/gm. as determined by B.E.T. nitrogen adsorption. This method has been shown to be reliable and analytically acceptable method of determining the surface area of such particulate material.

Comparing the results of Example 1 and Example 2, the abraded massive nickel had an activity approximately 400 times greater than the activity of Raney nickel.

EXAMPLE 3

This example, using the same reactants as in Example 1, was performed to determine the effect of abrading the surface of the massive nickel catalyst during a gas phase reaction with respect to the following:

(1) Generation of pure metal surface through removal of contaminants;
(2) Increase of bulk or surface mass transfer; and
(3) Modification of the catalyst surface energy state.

Using the apparatus and procedure as detailed in Example 1, the activity of an abraded nickel disc was again determined to be 7.1×10$^{-5}$ moles/cm.$^2$ min. as in Example 1. The rotating abrader was then withdrawn 0.012 inch from the abraded nickel disc surface. Activities of 4.2×10$^{-5}$ and 4.1×10$^{-5}$ moles/cm.$^2$ min. were determined at abrader surface speeds (no contact between abrader and nickel disc) of 63 and 31 cm./sec., respectively. As found in Example 2, the activity of Raney nickel under similar reaction conditions was 3.8×10$^{-7}$ moles/cm.$^2$ min.

The results of this experiment demonstrate that:

(1) Assuming a pure, clean nickel surface was present for Raney nickel, the activity of the mechanically abraded nickel disc cannot be explained alone by the generation of pure, clean nickel surface on the disc.

(2) The activity of the mechanically abraded nickel disc cannot be fully accounted for in this reaction in terms of enhanced bulk mass transfer of reactants and products (as discussed hereinafter).

(3) The large change in activity of the massive nickel surface results primarily from the change in the surface energy states caused by abrasion of the nickel disc. The type of abrasion employed in these experiments involved almost no stock removal but rather produced lattice distortion and disorder in the surface of the nickel disc.

The minimal effect to the activity of the nickel disc due to bulk mass transfer in a gas phase reaction system such as the reaction between hydrogen and ethylene in the presence of a metal catalyst is to be expected. Assuming that the hydrogen-ethylene gas mixture conforms to the ideal gas laws, the number of moles of gas molecules impinging and subsequently absorbing on a unit surface area of a solid surface can be found from the following equation suggested by Knudsen in Ann Physik, 47, 697 (1915):

$$\text{Moles} = \gamma_i P_i (2\pi R T M_i)^{-\frac{1}{2}}$$

where $\gamma_i$ is the fraction of the total moles which after colliding with the surface are absorbed. ($M_i$) is the molecular weight of species ($i$) whose equilibrium partial pressure is ($P_i$) at the temperature (T). (R) is a kinetic gas constant. The total number of moles of $C_2H_4$ (having the slower impingement rate in the present system) impinging on the abraded surface of the massive catalyst (10 cm.$^2$) for $P_{C_2H_4} = 164$ p.s.i.a., $\gamma_i = 1$ and $T = 300°$ K. is 2.4×10$^3$ mole/min. For a clean metal surface, as could be expected after abrasion, $\gamma_i$ varies between 1.0 and 1×10$^{-3}$. Therefore, between 2.4 and 2.4×10$^3$ moles/min. could be absorbed on such a surface. The reaction rates encountered in the above examples were well below these values (less than $5.1 \times 10^{-3}$ mole/min.). Bulk mass transfer resulting from the abrasive treatment would not be expected to be a dominant factor, and the experimental results obtained above show this to be the case.

EXAMPLE 4

The ability of the present invention to provide increased bulk mass transfer in catalytic reactions involving a massive solid surface can be demonstrated in a gas liquid phase reaction such as the liquid styrene-gaseous hydrogen-catalyst system.

The apparatus of Example 1 was utilized in reacting styrene and hydrogen in the presence of a massive nickel catalyst surface. Liquid styrene which covered the abrader and catalyst surface was set in motion by the vigorous movement of the rotating abrader. After purging the reactor with hydrogen, hydrogen was charged to the reactor to a specified pressure. The abrader was then set in motion and brought into contact with the nickel catalyst. The reaction of hydrogen and styrene was monitored by the pressure drop in the reactor.

In FIG. 4 there is shown the average reaction rate as a function of abrader-catalyst surface speed where the catalyst abrader horizontal sliding force was held constant. The reaction rate is seen to be a linear function of the surface speed between 21 and 63 cm./sec. The catalytic activity will be shown hereinafter to also be a function of mechanical power dissipated on the abraded catalyst surface; therefore, no conclusion can be drawn from this one set of data concerning the bulk mass transport of reactants to and from the catalyst surface. However, when the abrader was withdrawn 0.012 in. from the catalyst surface so that no mechanical power is dissipated on the catalyst surface, the activity of the nickel catalyst was again found to be a linear function of the speed of the abrasive disc as shown in FIG. 4. In addition, the slopes of each rate versus surface speed plot are equal, thus indicating that the reaction rate has a similar dependence on abrader-catalyst surface speed when the catalyst is being abraded as well as when the catalyst is not being abraded. This indicates that bulk mass transfer was a limiting aspect in both situations; an increase in abrader surface speed increased the bulk rate of mass transfer of reactants to the catalyst surface and thereby an increase in activity was noted. The data shown in FIG. 4 demonstrates that the activity of the catalyst is also dependent upon the continuous abrasive action on the surface of the nickel catalyst. When the abrasive means was moved out of contact with the catalyst surface, an immediate decrease in activity results as shown by the displacement between the two curves of FIG. 4.

EXAMPLE 5

Using the apparatus and procedure of Example 4, the activity of the abraded nickel disc at various abrader-catalyst speeds and contact pressures was determined for the reaction of styrene and hydrogen. The activity of Raney nickel catalyst was also determined under similar reaction circumstances by removing the nickel catalyst disc and substituting particulate Raney nickel catalyst in the reactor in place of the nickel disc. The results and comparison of the activity of the abraded nickel disc and the particulate Raney nickel is shown in Table II.

TABLE II

| | Activity (moles/ cm.² min.) | Abrader-catalyst horizontal sliding force per contact area (grams/ cm.²) | Abrader speed relative to catalyst surface (cm./sec.) |
|---|---|---|---|
| Abraded nickel disc | $4.4 \times 10^{-4}$ | 90 | 63 |
| Do | $1.8 \times 10^{-4}$ | 150 | 11 |
| Particulate Raney nickel | $2.6 \times 10^{-7}$ | None | |

The activity of the Raney nickel was based on the surface area of the particulate Raney nickel being 50 m.²/gm. as found in Example 2. As Table II demonstrates, the abraded nickel disc of this invention exhibited an activity of up to 1,700 times the activity of the Raney nickel.

EXAMPLE 6

Using the ethylene-hydrogen system of Example 1, the time required to increase the catalytic activity of the nickel disc was determined. The nickel disc was first annealed for four minutes in a hydrogen atmosphere at approximately 700° C. The nickel disc was then abraded for three minutes after which the activity of the nickel disc was determined. The power dissipated on the nickel disc surface was constant for the three minute period. The total energy expended during the three minute period was $1.09 \times 10^3$ joules. The activity of the nickel disc increased from the annealed state value of less than $1.9 \times 10^{-7}$ moles/cm.² min. to a value of $9.5 \times 10^{-5}$ moles/cm.² min. for the abraded nickel disc after three minutes of abrasion.

Comparing this activation time and activity level to the values reported by Heinicke in Abk. Deut. Akad. Wiss. Berlin, Chem. Geol. Biol, 1, 101 (1966) where a massive, solid nickel catalyst was impacted with fine corundum in a vibration mill shows the large unexpected results of the present invention. Heinicke reported a 100 fold maximum increase in catalytic activity after 90 minutes activation. This compares to the approximate 500 fold increase in activity of the present invention after only three minutes activation. Slightly longer periods of activation can be used to obtain the several thousand fold increases reported in the previous examples.

EXAMPLE 7

Using the apparatus and procedures of Example 1, a correlation between mechanically induced catalytic activity and the variables of power input, horizontal sliding force and catalyst-abrader surface speed was made.

Figure 5:
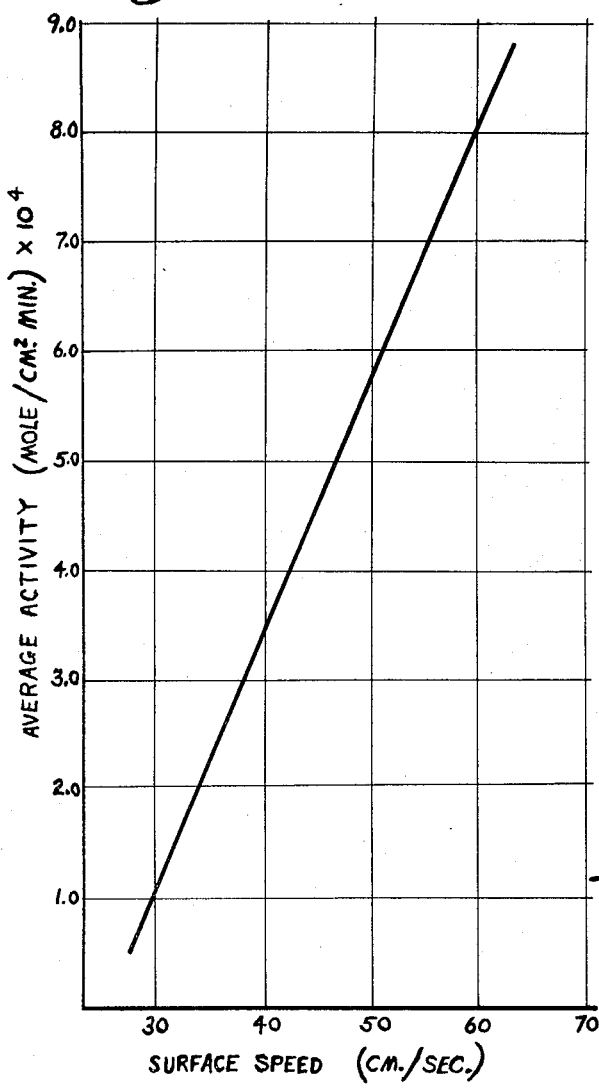
FIG. 5 is a graph showing the activity of a nickel disc catalyst as a function of the power supplied to the abrading means.

The mechanically induced activity of the nickel disc was found to be proportional to the input power transferred to the disc surface as shown diagrammatically in FIG. 5.

The mechanically induced activity was found to be relatively insensitive to changes in horizontal sliding forces from approximately 10 to 96 grams per cm.² abrader-catalyst contact area. Decreased activity was found to occur at a horizontal sliding force greater than approximately 100 grams per cm.² abrader-catalyst contact area. This decrease may have been caused by thermal or mechanical deterioration of the abrasive means resulting in catalyst poisoning and/or less effective abrasion.

Figure 6:
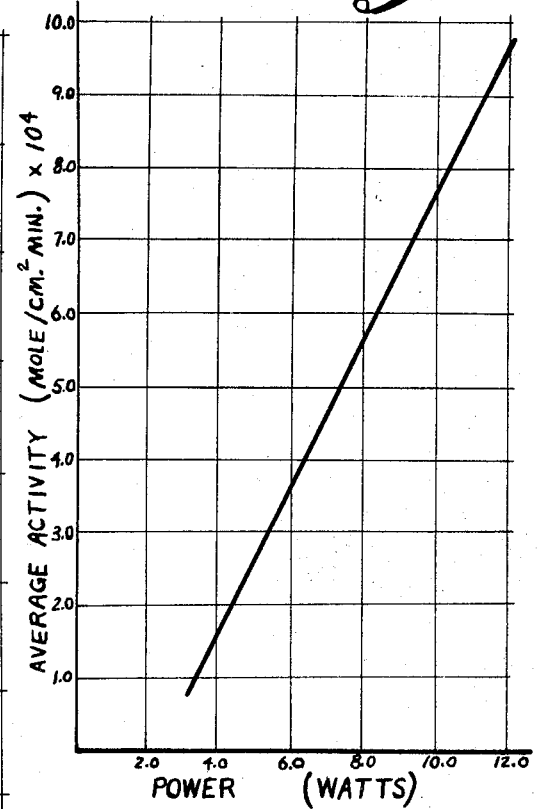
FIG. 6 is a graph showing the reaction rate of the surface of a nickel disc catalyst as a function of the surface speed of the abrading means.

The mechanically-induced activity was found to be proportional to the abrader-surface speed as shown in FIG. 6.

EXAMPLE 8

Controlled abrasion of the catalyst surface was found to be an effective method of removing any catalyst poison contained in the reaction mixture and maintaining an active catalyst surface. In addition, the controlled abrasion of the metal surface can act as a getter for catalyst poisons in a reaction mixture prior to introducing the reactants to the catalytic reactor.

Controlled amounts of hydrogen sulfide, a known poison for nickel catalysts in the hydrogenation of ethylene, were introduced into the reactor of Example 1 which also contained hydrogen and ethylene. The amount of hydrogen sulfide was varied from 142 parts per million to 270 parts per million. The hydrogenation of ethylene, in each case, was prevented until the hydrogen sulfide concentration of the reactant gases had been lowered as a result of the gettering action produced by catalyst abrasion to approximately 22 parts per million. The hydrogen sulfide poison was likely removed from the reactants by forming nickel sulfides on the surface of the catalyst disc which were then abraded off exposing fresh nickel surface.

EXAMPLE 9

Using apparatus similar to that shown in FIG. 1, carbon monoxide was catalytically oxidized to carbon dioxide in the presence of a copper oxide catalyst disc which was abraded similarly to the nickel catalyst disc of Example 1.

A feed stock whose flow rate to the reactor was 1.7 liters/min. S.T.P. contained approximately 3000 parts per million carbon monoxide in a gas mixture composed of approximately 78% nitrogen and 22% oxygen. The reaction was conducted at a temperature of 107° C. The 4 inch, rotated catalyst disc was composed of copper; however, at the temperature of the reaction the surface of the copper disc would consist essentially of oxides of copper. The reaction products were monitored by gas chromatographic determination of the gases emitting from the reaction chamber. When the disc was rotated at 600 r.p.m. in contact with the abrasive device which was held fixed, such that an average horizontal sliding force of 20 g. per unit abraded surface area was developed, an activity of $(1.9 \pm 0.2) \times 10^{-7}$ mole/cm.$^2$ min. was attained. Under similar conditions, the activity of chemically produced copper oxide catalyst has been reported in the literature (Thomas et al., I & EC Process Design and Development, 8, #2, 282, 1969) to be $2.0 \times 10^{-10}$ mole/cm. Thus, application of the process of the present invention produces an approximate 1000 fold increase in the catalytic activity over the prior art catalyst.

The present process can be utilized to improve the catalyst activity of many other solid catalysts in addition to those mentioned above, e.g., nickel oxide, copper, copper oxide, iron, iron oxide, bismuth oxide, molybdenum oxide, aluminum, alumina, zinc, zinc oxide magnesium, magnesium oxide, chromium, chromium oxide, vanadium, vanadium oxide, platinum, molybdenum sulfide, cobalt, cobalt oxide and lead bromide.

What is claimed is:

1. A process for attaining and maintaining increased reaction in a heterogenous chemical reaction in the presence of a surface of a massive solid catalyst having a relatively smooth surface, the catalytically effective area of which is essentially the geometric surface area of said body defined by the external dimensions thereof, which is subject to continued contamination by poisons and other film forming substances, which comprises:
    (a) continuously moving across the surface of the massive catalyst a porous matrix material having a plurality of abrasive particles, held in a fixed, spaced arrangement on the surface and in the interior thereof, said particles being chemically inert in said reaction; and
    (b) maintaining said porous matrix in contact with the surface of the massive solid catalyst during a substantial portion of said reaction to abrade said surface;

thereby creating nascent, highly reactive, catalytic areas on the surface of said massive catalyst and removing said poisons and other film forming substances from the surface of said massive catalyst, said matrix having sufficient porosity and being maintained sufficiently close to said surface during substantially all of said reaction, so as to continuously carry reactants into contact with the nascent, fresh catalytic surface and to continuously remove reaction products from the catalytic surface.

2. A process as claimed in claim 1 wherein the massive solid catalyst is composed of a member selected from the group consisting of nickel, nickel oxide, copper, copper oxide, iron, iron oxide, bismuth oxide, molybdenum oxide, aluminum, alumina, zinc, zinc oxide, magnesium, magnesium oxide, chromium, chromium oxide, vanadium, vanadium oxide, platinum, molybdenum sulfide, cobalt, cobalt oxide and lead bromide.

3. A process as claimed in claim 1 wherein the solid catalyst mass is composed of nickel and the chemical reaction is one of hydrogenation.

4. A process as claimed in claim 1 wherein the contacting under controlled pressure of the catalyst surface with the porous matrix material is done periodically.

5. A process as claimed in claim 1 wherein the solid catalyst mass is composed of copper oxide and the chemical reaction is one of oxidation.

6. In a method of conducting a heterogenous chemical reaction in the presence of a surface of a massive solid catalyst which is subject to continued contamination by poisons and other film-forming substances contained in the reactants fed to the reaction and products formed in the reaction, the improvement comprising the steps of:
    (a) contacting, under controlled pressure, the surface of the massive catalyst during the course of the reaction with a porous matrix material having a plurality of abrasive particles held in a fixed, spaced arrangement on the surface thereof; and
    (b) maintaining relative motion between the porous matrix material and the surface of the massive solid catalyst continuously during the course of the chemical reaction, whereby the abrasive contact with the solid catalyst surface creates nascent, highly reactive, catalytic areas on said catalyst surface and removes said poisons and other film-forming substances from the surface of said solid catalyst, and whereby the porous matrix material continuously transports reactants to the solid catalyst surface.

7. A process as claimed in claim 6 wherein the contacting under controlled pressure of the catalyst surface with the porous matrix material is done periodically.

8. A process as claimed in claim 6 wherein the porous matrix material also conveys reactants to the surface of the massive solid catalyst and transports the reaction product from said surface.

9. A process as claimed in claim 6 wherein the solid catalyst mass is composed of nickel and the chemical reaction is one of hydrogenation.

10. A process for attaining and maintaining increased reaction in the hydrogenation of hydrocarbons containing olefinic unsaturation in the presence of a surface of a massive solid nickel catalyst having a relatively smooth surface, the catalytically effective area of which is essentially the geometric surface area of said body defined by the external dimensions thereof, which is subject to continued contamination by poisons and other film forming substances, which comprises:
    (a) continuously moving across the surface of the massive nickel catalyst a porous matrix material having a plurality of abrasive particles, held in a fixed, spaced arrangement on the surface and in the interior thereof, said particles being chemically inert in said hydrogenation reaction; and
    (b) maintaining said porous matrix in contact with the surface of the massive solid nickel catalyst during a substantial portion of said reaction to abrade said surface;

thereby creating nascent, highly reactive, catalytic areas on the surface of said massive catalyst and removing said poisons and other film forming substances from the surface of said massive catalyst, said matrix having sufficient porosity and being maintained sufficiently close to said surface during substantially all of said reaction, so as to continuously carry olefinic hydrocarbons and hydrogen into contact with the nascent, fresh catalytic nickel surface and to continuously remove reaction products from the nickel surface.

11. A process for attaining and maintaining increased reaction in the oxidation of carbon monoxide on a copper oxide catalyst in the presence of a surface of a massive solid catalyst having a relatively smooth surface, the catalytically effective area of which is essentially the geometric surface area of said body defined by the external dimensions thereof, which is subject to continued contamination by poisons and other film forming substances, which comprises:

(a) continuously moving across the surface of the massive catalyst a porous matrix material having a plurality of abrasive particles, held in a fixed, spaced arrangement on the surface and in the interior thereof, said particles being chemically inert in said reaction; and (b) maintaining said porous matrix in contact with the the surface of the massive solid nickel catalyst during stantial portion of said reaction to abrade said surface;

thereby creating nascent, highly reactive, catalytic areas on the surface of said massive catalyst and removing said poisons and other film forming substances from the surface of said massive catalyst, said matrix having sufficient porosity and being maintained sufficiently close to said surface during substantially all of said reaction, so as to continuously carry said carbon monoxide into contact with the nascent, fresh copper oxide surface and to continuously remove reaction products from the catalytic surface.

References Cited

UNITED STATES PATENTS

| | | | |
|---|---|---|---|
| 1,412,219 | 4/1922 | Richardson | 252—411 R |
| 2,892,771 | 6/1959 | Milliken | 252—411 R X |
| 3,060,117 | 10/1962 | Payne | 252—411 R X |

PATRICK P. GARVIN, Primary Examiner

U.S. Cl. X.R.

260—667, 684, 690; 423—437